United States Patent [19]

Schuder et al.

[11] 4,022,075

[45] May 10, 1977

[54] INTERVAL TIMER

[75] Inventors: Maurice E. Schuder, Indianapolis; David W. Underwood, Clayton; Richard H. Weber, Indianapolis, all of Ind.

[73] Assignee: P. R. Mallory & Co., Inc., Indianapolis, Ind.

[22] Filed: Oct. 31, 1975

[21] Appl. No.: 627,716

Related U.S. Application Data

[63] Continuation of Ser. No. 522,975, Nov. 11, 1974, abandoned, and a continuation of Ser. No. 404,850, Oct. 10, 1973, abandoned.

[52] U.S. Cl. .................................. 74/437; 74/568 T

[51] Int. Cl.[2] .......................................... F16H 55/04

[58] Field of Search ......... 58/21.13; 74/437, 568 T; 200/38

[56] References Cited

UNITED STATES PATENTS

| | | | |
|---|---|---|---|
| 1,068,395 | 7/1918 | Shaumberg | 58/21.13 |
| 2,261,723 | 11/1941 | Hoffman | 58/21.13 |
| 2,565,017 | 8/1951 | Brown | 58/21.13 |
| 3,568,429 | 3/1971 | De Lille | 58/21.13 |
| 3,590,527 | 7/1971 | Niznik | 58/125 C |
| 3,610,753 | 10/1971 | Neubauer | 58/21.13 |

*Primary Examiner*—Samuel Scott
*Assistant Examiner*—Wesley S. Ratliff, Jr.
*Attorney, Agent, or Firm*—Hoffmann, Meyer, and Coles

[57] ABSTRACT

An interval timer providing a relatively large number of settings between two extreme time intervals wherein two cooperating snail gears drive a drum and a cam, and wherein a partial gear disengages a motor drive means from one of the snail gears to intermittently stop the snail gears' rotation.

5 Claims, 3 Drawing Figures

INTERVAL TIMER

This application is a continuation of Ser. No. 522,975, Nov. 11, 1974; a continuation of Ser. No. 404,850, Oct. 10, 1973, both now abandoned.

Generally speaking, the present invention relates to an interval timer which comprises an axle; a drum rotatably carried by the axle; and having indicia disposed about a periphery of the drum and spaced in a logarithmic scale; means for manually setting the drum at a predetermined indicia setting; a snail gear carried by said drum; a gear member meshing with the snail gear; and drive means coupled to the gear member.

The interval timer of the present invention may be useful for a variety of applications such as timing cooking periods, sunlamp exposures, etc. in which it is desirable to indicate the termination of a time period by actuating an alarm.

Two problems associated with these timers are the impossibility of setting long periods of time on short scales and the inherent inaccuracy of setting short periods of time on long scales. Many interval timers utilize linear scales having short scales of only several minutes, so that setting short periods of time can be accurately accomplished. For example, timing a 3 minute egg of a 5 minute linear scale timer encompasses over half the scale, and, therefore, the relative setting accuracy is good. However, this example of a short scale timer cannot be used to time an event of more than 5 minutes with one setting.

On the other hand, a long linear-scale timer of, for example, 3 hours such as those used on kitchen ranges cannot be accurately set to short periods of minutes. In the case of the 3 minute example, this period of time encompasses only one sixtieth of this scale. A logarithmic scale having large divisions for minutes on the lower end of the scale that taper off to hours on the higher end of the scale would solve this problem. Attempts have been made to utilize a logarithmic scale in an interval timer. While such mechanisms have, for the most part, been successful, they were extremely complicated with many parts, and therefore costly to produce and difficult to maintain.

Accordingly, it is a feature of the present invention to provide an interval timer which provides a relatively large number of settings between two extreme time intervals. Another feature of the present invention is to provide an interval timer with the capability of accurately setting minutes on one end of a scale and hours at the other end. Another feature of the present invention is to provide an interval timer having a drum with a logarithmic time scale around its periphery, the drum being driven through a snail gear. Another feature of the invention is to provide an interval timer having a drum driven through a snail gear and a cooperating gear member, the drum having logarithmic settings on its periphery. Still another feature of the present invention is to provide an interval timer having a drum with logarithmic settings and a cam carried by the drum capable of actuating a device, such as an alarm, at the end of a predetermined period of time. Yet another feature of the invention is the provision of an interval timer having a drum with logarithmic time scale around its periphery, the drum being driven through two cooperating snail gears. Another feature of the invention is the provision of an interval timer having a drum driven by two cooperating snail gears with a stop means being carried by one of the snail gears and engaging the other snail gear. Another feature of the invention is to provide an interval timer having a partial gear to stop rotation of a drum at a predetermined period of time. These and other features of the invention will become apparent from the following description taken in conjunction with the accompanying drawings wherein:

Figure 1:
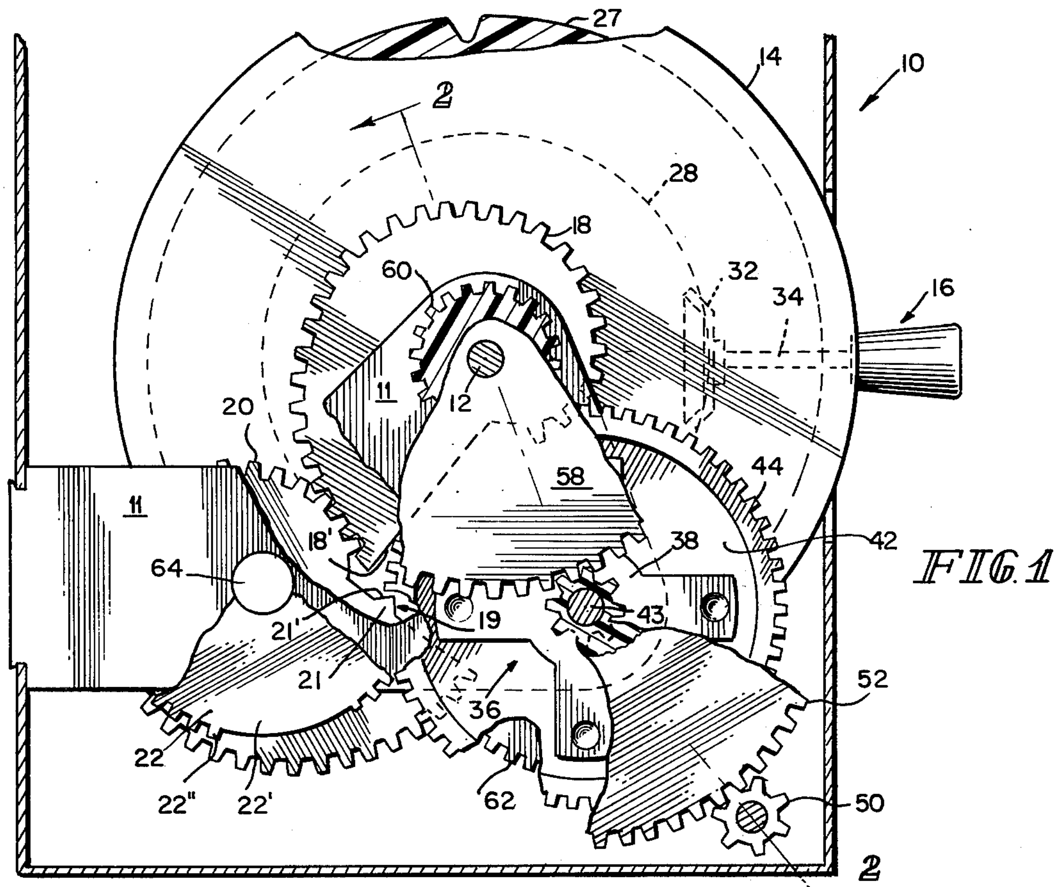
FIG. 1 is a vertical section of the interval timer.

Referring now to the drawings, the interval timer 10 of the present invention, in general, includes an axle 12, a drum 14 rotatably carried about the axle, means 16 for manually setting the drum at a desired setting, a first snail gear 18 carried by the drum, a second snail gear 20 meshing with the first snail gear, a partial gear 22 coupled to the second snail gear, and a drive means 24 coupled to the partial gear. Axle 12 is fixedly carried in plates 11 and 13.

Figure 3:
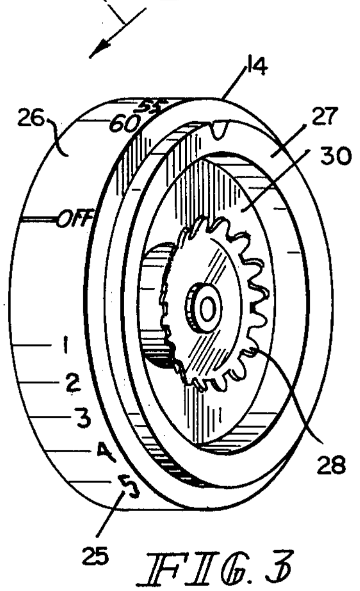
FIG. 3 is a pictorial view of a drum used to indicate time intervals for the timer.

With particular reference to FIG. 3, drum 14 includes an outermost periphery 26 having disposed thereon indicia 25. The indicia is spaced so as to provide a logarithmic scale. Such scale permits numerous settings of the drum between extreme intervals of time. And in addition such scale provides for accurate settings where needed. Thus, for example, if the scale is calibrated for a maximum time travel of 2 hours, the length of divisions in the first hour, and particularly in the first portion of the first hour is much greater in length than the length of corresponding divisions in the third hour. An error of a minute in setting of a time interval of 3 hours would be of little consequence whereas an error of a minute in a time interval of 3 minutes would be very substantial. By using a logarithmic scale in which the lengths of the divisions progressively increases in proceeding from the maximum reading back to zero, it is possible within 360° to provide a maximum time interval greater than 1 hour while at the same time assuring an accuracy of a minute at the lower end of the scale.

Figure 2:
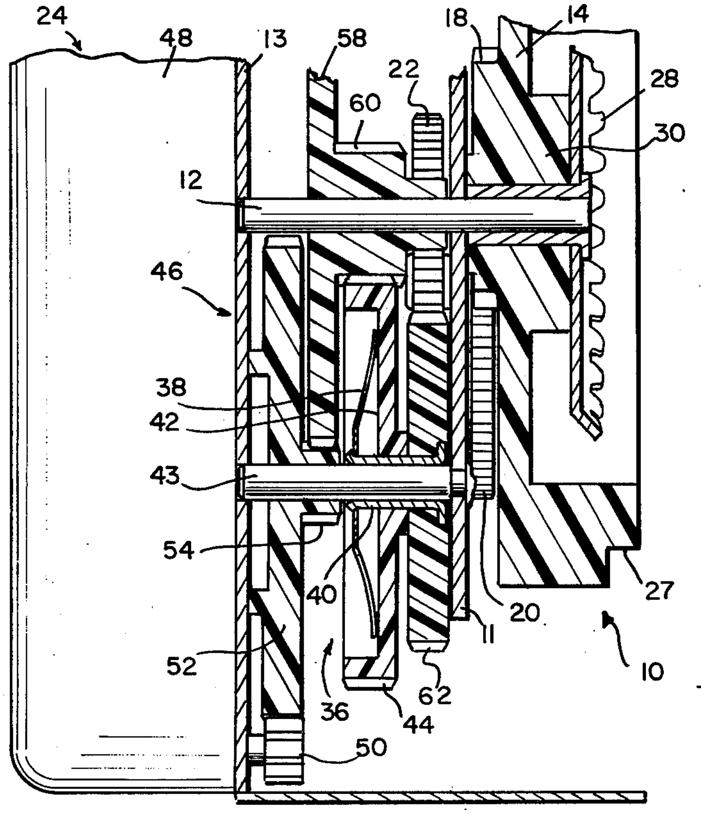
FIG. 2 is a section taken along the line 2—2 of FIG. 1.

Returning to FIGS. 1 and 2, snail gears 18 and 20 are complimentary and are designed to provide a progressively varying gear ratio. Snail gear 20 is the driving gear and rotates continuously at a constant speed. By reason of the spiral shape (increasing radius), the rate of rotation of the driven gear 18 and the corresponding rate of travel of drum 14 increases with the increasing length of the divisions of logarithmic scale 25.

There is a cam 27 integrally attached or otherwise carried by the drum 14. Cam 27 may be used to actuate some type of device. For example, the cam could actuate a double pole switch to actuate an alarm and shut-off electrical power to the timer. The cam, of course, will be automatically set when the indicia of drum 14 is set.

The means 16 for manually setting drum 14 includes a first crown gear 28 which is integral or otherwise carried by hub 30 of drum 14, a second crown gear 32 which meshes with the first crown gear and which is carried on post 34, and clutch means 36. Clutch means 36, in the present embodiment of the invention, is also included as an element of drive means 24 and includes a leaf spring 38 carried on sleeve 40, the spring further frictionally engaging a face 42 of gear 44. Gear 44 is also carried by sleeve 40, the sleeve being rotatably carried on post 43. Manual rotation of post 34 sets drum 14 through crown gears, the spring 38 of clutch means 36 slipping against the load of gear train 46 of drive means 24.

Drive means 24 includes a suitable drive motor 48, which is coupled to gear train 46 through motor output pinion 50. Gear train 46 includes gear 52 and pinion 54 rotatably carried on post 43; gear 58 and pinion 60 rotatably carried on axle 12, gear 58 meshing with pinion 54; gear 44 of clutch means 36 which engages pinion 69, and gear 62 which is carried on sleeve 40. Gear 62 meshes with partial gear 22.

A stop means 19 is carried by snail gear 20. Stop means 19 prevents excessive rotation of drum 14 and the cooperating snail gears such that the snail gears cannot become disengaged. Stop means 19 includes lug 21 extending from step 20′ of the snail gear. Surface 21′ of the lug engages the step 18′ of snail gear 18 to prevent further manual rotation of the snail gears and drum 14.

Partial gear 22 includes a hub portion 22′ and a number of teeth 22″ extending around a portion of the periphery of the hub portion. Partial gear 22 and snail gear 20 are both fixedly carried on shaft 64 which is rotatably journaled in plate 11. Thus the partial gear and the snail gear rotate together and they are synchronized. The number of teeth in the partial gear is, therefore, determined by its synchronization with the snail gears 18 and 20 and the logarithmic indicia 28. That is to say, the number of teeth must be limited to such that there will be no teeth (and thus no further rotation of the snail gears or the drum) when the drum reaches its "zero" position. At such zero position the teeth of gear 62 will no longer be in mesh with partial gear 22, and therefore drive means 24 will be free to rotate.

In operation, the indicia on drum 14 is set to its desired position through manual rotation of post 34 which turns the drum through crown gears 28 and 32, the manual rotation being effected through clutch means 36. This also sets the snail gears 18 and 20, and partial gear 22 as well as cam 28. Stop means 19 prevents rotation of drum 14 past 360° and then prevents snail gears 18 and 20 from becoming disengaged. Power driven rotation is then applied to the drum from motor 48 through the gear train 46, partial gear 22, and snail gears 18 and 20. When zero is reached on the drum, gear 62 no longer meshes with partial gear 22 because the "missing teeth" portion of the gear has been reached and rotation of the partial gear stops. Likewise, rotation of drum 14 stops and cam 27 will actuate a device, such as an alarm to signal the end of the cycle.

What is claimed is:

1. An interval timer comprising:

a. an axle;

b. a drum rotatably carried about said axle, and indicia disposed about a periphery of said drum and spaced in a logarithmic scale;

c. means for manually setting said drum at a predetermined indicia setting;

d. a first snail gear carried by said drum;

e. a second snail gear meshing with said first snail gear;

f. a motor coupled through a gear train to said gear member;

g. a partial gear fixedly carried for rotation by said second snail gear and having a hub and teeth extending around a portion of said hub and meshing with teeth of a gear of said gear train; and h. stop means preventing disengagement between said first and second snail gears comprising a lug extending from a step of one of said snail gears engaging a step of the other snail gear.

2. An interval timer according to claim 1 further including a cam carried by said drum.

3. An interval timer according to claim 1 wherein said means for manually setting said drum includes a first crown gear carried by said drum and a second crown gear carried by a shaft and meshing with said first crown gear.

4. An interval timer according to claim 3 wherein said means for manually setting said drum further includes clutch means permitting manual rotation of said shaft independent of said drive means.

5. An interval timer according to claim 4 wherein said clutch means includes a gear of said gear rotatably carried on a post and a spring rotatably carried on said post and frictionally engaging a face of said gear.

* * * * *

UNITED STATES PATENT AND TRADEMARK OFFICE
CERTIFICATE OF CORRECTION

PATENT NO. : 4,022,075
DATED : May 10, 1977
INVENTOR(S) : Maurice E. Schuder et al It is certified that error appears in the above-identified patent and that said Letters Patent are hereby corrected as shown below:

Column 3, line 9 delete "69" and insert ---60---.

Column 3, line 31 insert " " around the word zero.

Column 4, line 1 insert " " around the word zero.

Column 4, line 40, insert ---train--- before "rotatably".

Signed and Sealed this

*Eighth* Day of *November 1977*

[SEAL]

*Attest:*

RUTH C. MASON
*Attesting Officer*

LUTRELLE F. PARKER
*Acting Commissioner of Patents and Trademarks*